US008396762B2

(12) United States Patent
Esau et al.

(10) Patent No.: US 8,396,762 B2
(45) Date of Patent: Mar. 12, 2013

(54) SYSTEMS AND METHODS FOR VALIDATING SUBSITITUTION CHAINS OF AN ORDER

(75) Inventors: Andreas Esau, Oestringen (DE); Thomas Mayer, Leimen (DE)

(73) Assignee: SAP AG, Walldorf (DE)

( * ) Notice: Subject to any disclaimer, the term of this patent is extended or adjusted under 35 U.S.C. 154(b) by 1303 days.

(21) Appl. No.: 11/594,729

(22) Filed: Nov. 9, 2006

(65) Prior Publication Data

US 2007/0106412 A1    May 10, 2007

(30) Foreign Application Priority Data

Nov. 10, 2005    (EP) .................................. 05077563

(51) Int. Cl.
  G06Q 30/00    (2006.01)
  G06Q 10/00    (2006.01)
  A01K 5/02    (2006.01)
  G06F 17/50    (2006.01)
  G07B 17/00    (2006.01)
  G07F 19/00    (2006.01)

(52) U.S. Cl. ........ 705/28; 705/26.2; 705/26.63; 705/29; 705/30

(58) Field of Classification Search ........................ None
See application file for complete search history.

(56) References Cited

U.S. PATENT DOCUMENTS

| | | | | |
|---|---|---|---|---|
| 5,872,844 | A * | 2/1999 | Yacobi | 705/69 |
| 5,884,290 | A * | 3/1999 | Smorodinsky et al. | 705/44 |
| 6,012,035 | A * | 1/2000 | Freeman et al. | 705/2 |
| 6,064,990 | A * | 5/2000 | Goldsmith | 705/75 |
| 6,188,989 | B1 * | 2/2001 | Kennedy | 705/7.25 |
| 6,269,345 | B1 * | 7/2001 | Riboud | 705/35 |
| 6,324,523 | B1 * | 11/2001 | Killeen et al. | 705/36 R |
| 6,826,545 | B2 * | 11/2004 | Kawashima et al. | 705/40 |
| 6,876,979 | B2 * | 4/2005 | Ling | 705/26.41 |
| 6,901,387 | B2 * | 5/2005 | Wells et al. | 705/64 |
| 6,963,847 | B1 * | 11/2005 | Kennedy et al. | 705/7.29 |
| 7,099,844 | B1 * | 8/2006 | Snijders et al. | 705/39 |
| 7,184,979 | B1 * | 2/2007 | Carson | 705/35 |
| 7,249,044 | B2 * | 7/2007 | Kumar et al. | 705/7.25 |
| 2002/0013728 | A1 * | 1/2002 | Wilkman | 705/14 |
| 2002/0133387 | A1 * | 9/2002 | Wilson et al. | 705/8 |
| 2003/0004870 | A1 * | 1/2003 | Van Rensburg et al. | 705/39 |
| 2003/0110136 | A1 * | 6/2003 | Wells et al. | 705/64 |

(Continued)

OTHER PUBLICATIONS

Shrider, David G. (2003). Two essays in finance. Ph.D. dissertation, University of South Carolina, United States—South Carolina. Retrieved May 17, 2012, from ABI/INFORM Global.(Publication No. AAT 3098705).*

(Continued)

Primary Examiner — Jason Dunham
Assistant Examiner — Nancy Mehta
(74) Attorney, Agent, or Firm — Finnegan, Henderson, Farabow, Garrett & Dunner L.L.P.

(57) ABSTRACT

Systems and methods are provided for automatically determining substitution chains that are valid during a rules-based ATP check for an order item. In one implementation, a system is provided that includes an interface for interfacing with a plurality of data storage devices in at least one of which a plurality of stock items are stored as data. The system also includes an execution memory storing software and a buffer for temporarily storing data. A processor coupled to the interface and the execution memory may carry out an availability check in which a replacement chain describing replacements is stored in the buffer. The replacement chain may be determined by one or more of rules defining substitutions.

15 Claims, 5 Drawing Sheets

U.S. PATENT DOCUMENTS

| | | | |
|---|---|---|---|
| 2003/0154163 A1* | 8/2003 | Phillips et al. | 705/39 |
| 2003/0172007 A1* | 9/2003 | Helmolt et al. | 705/28 |
| 2004/0139004 A1* | 7/2004 | Cohen et al. | 705/39 |
| 2006/0026143 A1* | 2/2006 | Hirth | 707/3 |
| 2006/0144926 A1* | 7/2006 | Jacobs | 235/380 |
| 2007/0094098 A1* | 4/2007 | Mayer et al. | 705/27 |
| 2007/0150387 A1* | 6/2007 | Seubert et al. | 705/31 |

OTHER PUBLICATIONS

Jill Cataldo. (Dec. 30, 2009). Coupon Queen: Results vary when making item returns. The Island Packet. Retrieved May 17, 2012, from ProQuest Newsstand. (Document ID: 1930097281).*

Strategic distribution, inc. (2012). (). Austin, United States, Austin: Dun and Bradstreet, Inc. Retrieved from http://search.proquest.com/docview/230603155?accountid=14753.*

\* cited by examiner

SYSTEMS AND METHODS FOR VALIDATING SUBSITITUTION CHAINS OF AN ORDER

BACKGROUND

I. Technical Field

The present invention generally relates to the field of data processing and to computerized systems and methods for validating substitution chains for an order. More particularly, and without limitation, the invention relates to methods and systems for automatically determining substitution chains that were valid during execution of a rules-based "available to promise" or ATP check for an order item.

II. Background Information

Supply chain management software systems, such as SAP's Supply Chain Management (SCM) system, often include a plurality of applications for managing a supply chain. These applications may include, for example, SAP Advanced Planning and Optimization (SAP APO) and Extended Warehouse Management (EWM). A core interface (CIF) connects SAP SCM with online transaction processing systems (OLTP), such as SAP Customer Relations Management (SAP CRM) and Enterprise Resource Planning (ERP). In particular, the core interface connects the OLTP to SAP APO.

In supply chain management systems, when a product is available to be promised to a customer, it is considered "available to promise" (ATP). Supply chain management systems, such as SAP APO, include software for determining whether a product is available to promise. The determination may include performing an availability check when a customer calls to place an order. If the system is unable to confirm an order, a rules-based availability (RBA) check may be carried out. A rules-based availability check can be used to automatically or manually optimize the decision making process between alternatives using predefined rules.

For example, a sales order item may be confirmed on basis of RBA. After saving the sales order data, the sales order data from an OLTP system is saved in, for example, a live cache and several database tables in SAP SCM. In general, and with view to RBA, such an item can be replaced by another item with a product and/or location that differs from the original product and.or location. This replacement can be executed by means of online ATP check or backorder processing (BOP). However, in conventional supply chain management systems, it is not possible to determine whether the item can possibly be replaced based on a new product and/or location, because it is necessary to evaluate RBA anew at the moment of selection. Accordingly, in conventional systems, a quick search of affected items is not possible. In particular, in conventional systems, once a sales order is saved, a complete rules evaluation is necessary. Thus, the quality and speed of the availability check application is compromised.

It is desirable to address one or more problems, such as those problems identified above, in conventional systems. In particular, it is desirable to improve backorder processing. It is further desirable to increase the speed with which aspects of the BOP can be carried out.

SUMMARY

In view of the foregoing, systems and methods are disclosed herein for overcoming one or more of the above-mentioned problems. In accordance with embodiments of the invention, systems and methods may be provided for validating substitution chains for an order. More specifically, embodiments of the invention include methods and systems for automatically determining substitution chains that were valid during execution of a rules-based ATP check for an order item.

Consistent with an embodiment of the present invention, a system is provided that automatically determines substitution chains that were valid during a last execution of a rules-based ATP check for an order item. The rules may define possible substitutions. The system may comprise an interface for interfacing with a plurality of data storage devices in at least one of which a plurality of stock items are stored as data; an execution memory storing a software system; a buffer for temporarily storing data; and a processor coupled to the interface and the execution memory. The processor may execute the software system to carry out an availability check in which a replacement chain describing replacements defined by one or more rules is stored in the buffer. In this way, a fast selection of related items with the same or similar ("similar" means they contain several equal replacements) RBA chains is provided, thus, increasing the speed of the system.

Consistent with another embodiment of the present invention, a computer-implemented method is proved that determines substitution chains that were valid during a last execution of a rules-based ATP check for an order item. The rules may define possible substitutions. The method may comprise interfacing with a plurality of data storage devices in at least one of which a plurality of stock items are stored as data; temporarily storing data in a buffer; and carrying out an availability check in which a chain describing replacements defined by one or more rules is stored in the buffer.

Consistent with yet another embodiment of the present invention, a computer-readable storage medium is provided that stores program instructions executable by a processor to determine substitution chains that were valid during a last execution of a rules-based ATP check for an order item according to the above-mentioned method.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
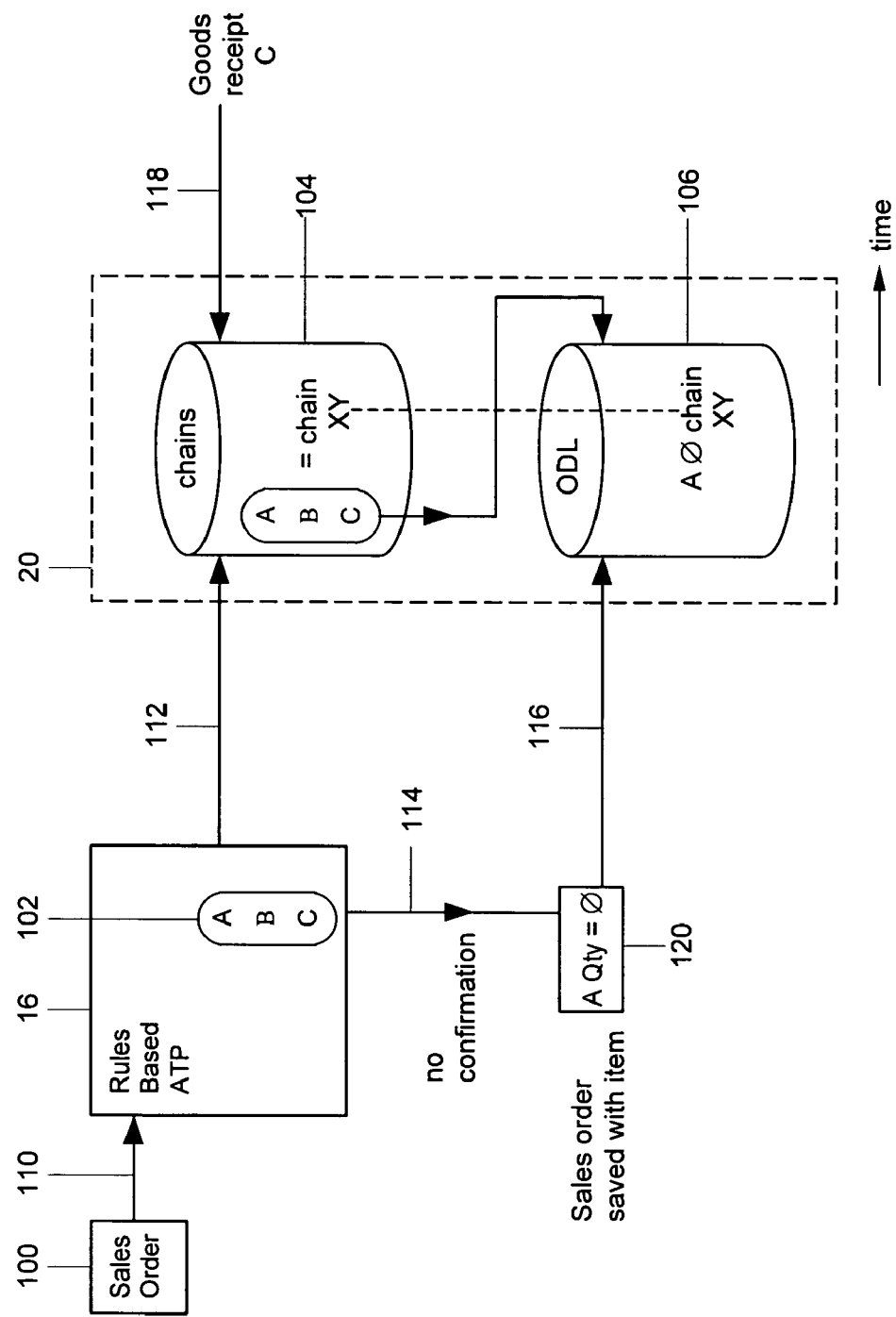
FIG. 1 illustrates an exemplary system for carrying out an availability check and a selection of ODL items under consideration of RBA chains, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

As mentioned, SAP CRM or ERP are OLTP systems. SAP CRM and ERP are systems for the daily online transaction processing where, for example, sales orders are entered. SAP APO is a component of SAP SCM. SAP APO is a logistic planning system. ATP is a component of SAP APO. A core interface CIF connects the OLTP to the SAP APO. It provides functions to transfer business data between the two types of systems. For example, an availability check is carried out when a customer enquires about placing an order. ATP is the component that executes the availability check. The availability check takes into account existing stock and also the quantities of future incoming or outgoing orders that should be delivered by the date of the order to determine whether the product is available to promise. If a quantity (of stock or an incoming order) is promised to a first customer, a second customer cannot access the reserved quantity. If there is not enough quantity to honor a complete order as requested, the order can be confirmed at a later date or may stay unconfirmed respectively partially confirmed. If the product is available to promise, the order can be confirmed. Rules-based availability checks may automatically or manually optimize the decision making process between alternatives using predefined rules.

In a sales order, RBA can cause creating of a main item with several sub-items reflecting the alternatives on product/location level. For example, if a customer orders a yellow car, the rule may specify that he will be given a red car instead. Similarly, if the order cannot be confirmed from stock in a first manufacturing location, the rule may specify that the order is honored from stock in a second manufacturing location. In this way, global ATP is provided to allow, for example, a switch between locations.

Further, in a situation where there are several orders that cannot all be confirmed, those order which cannot be confirmed become back orders. Back orders are sales documents whose order items cannot be completely confirmed as requested due to lack of availability or material shortages. Orders, including back orders, may be assigned a priority rating. For example, a high priority order and a low priority order. If a high priority order cannot be confirmed immediately, it becomes a back order. Back order processing (BOP) is a technical vehicle for dealing with back orders. BOP is a tool of the ATP component, for example in SAP APO. Using BOP, an available quantity of one or more products can be reallocated using a quantity of selected requirements. BOP may be carried out as interactive BOP or batch BOP.

FIG. 1 shows an exemplary system for carrying out an availability check, consistent with an embodiment of the present invention. During an ATP check, the chain of product and/or location substitutions, chain ABC 102, is stored in a buffer. For example, ABC 102 is stored in SAP SCM on an order item level until the order is saved and updated in SAP SCM. During the update process in SAP SCM, the last valid substitution chain 102 is saved in a separate database table 104. Each chain 102 has an ID "chain XY." A new chain/new chain ID is created only if there is no existing chain with same product-location-combinations, while on the contrary, their sequence may differ. For example, the chain ID "chain XY" may be used later as a connecting part by processes, where the determination of potential replacements of product-location-combinations in order items is necessary. In this way, the necessity of complete rules evaluation at selection is avoided.

With reference to FIG. 1, a sales order 100 is received (step 110). For example, it may be received from an OLTP system such as SAP CRM or ERP. The rules-based ATP check 16 carries out a rules-based ATP evaluation. Rules-based ATP (also referred to in the art as global ATP) provides the opportunity to check alternatives when the sales order cannot be completely confirmed. It is highly flexible. RBA evaluation may include one or more location product substitution chains 102. Further, each chain may comprise a set of one or more rules. For example, chain ABC 102 includes substitutions (location products) A, B and C. Location product A may result from a rule that exchanges, for example, red phones with yellow phones, if red is not available. Location product B may result from a rule that handles the case that there is a new product on the market and may be an instruction to first sell the old product. For example, if old product is out of stock, send new product. Location product C may result from a rule that arranges to check a second manufacturing location when a product is not available from a first manufacturing location, for example.

Chains 102 are stored (step 112) in a separate database table 104. Chains 102 are stored with an identifier. For example, the identifier for chain ABC is "XY." The chain ID is also assigned to corresponding items in an ODL 106. If during the RBA evaluation no confirmation is found for the sales order 100 (step 114), the sales order is saved as "confirmed quantity of location product A is equal zero." The non-confirmed sales order is saved in ODL 106 together with the identified chain. When a goods receipt for location product C is received (step 118), the orders that can now be confirmed by the receipt of the goods can be selected using the data stored in the ODL 106. Thus, non-confirmed orders can be confirmed on receipt of goods without having to carry out the RBA evaluation at the selection again. In this way, the system can react on received goods without having to run RBA again. For example, RBA chain identifiers have application during event driven quantity assignment (EDQA) together with order due lists (ODL) and during backorder processing (at the selection and at the parallelization of BOP).

Figure 2:
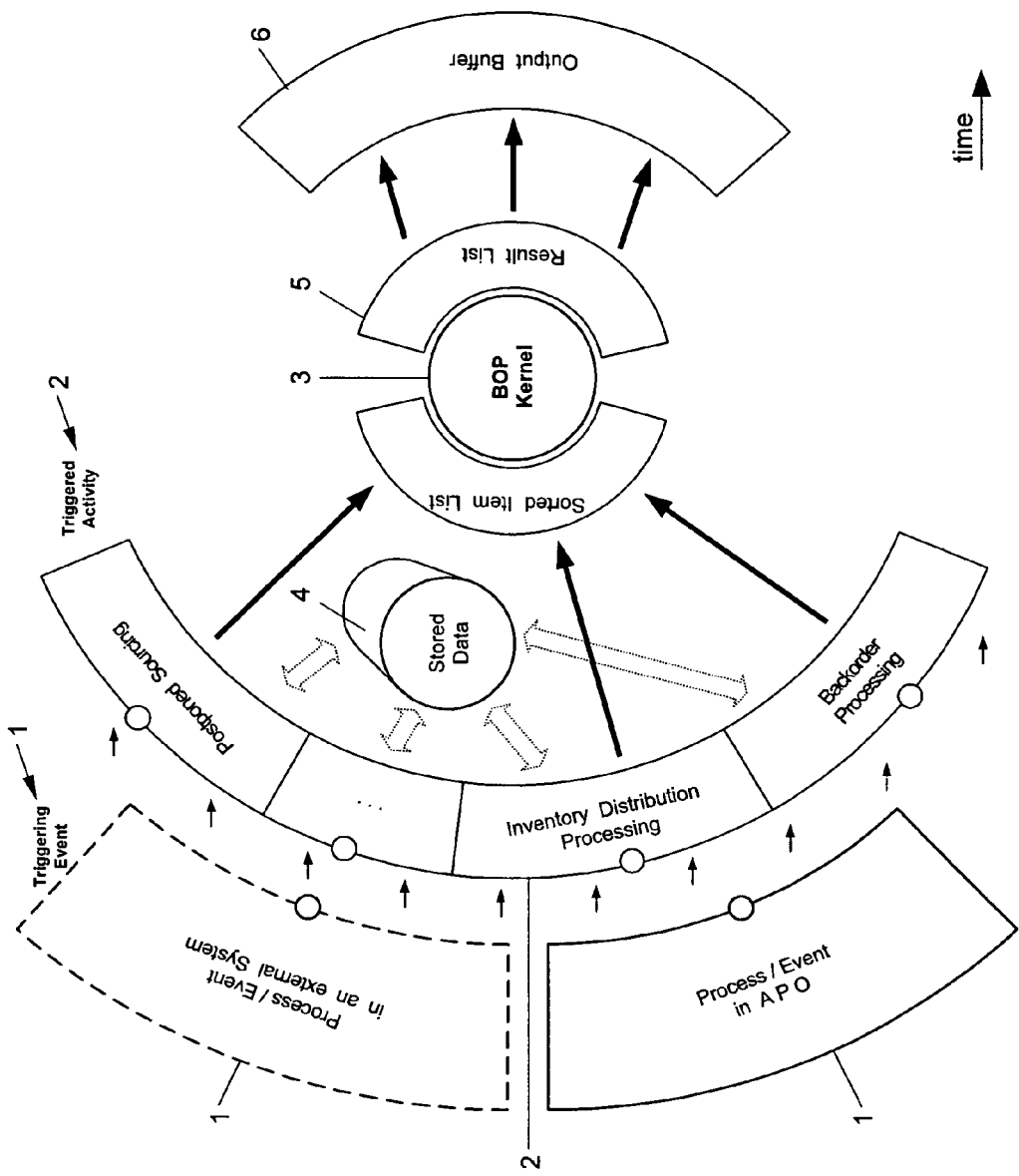
FIG. 2 illustrates an example of backorder processing (BOP), consistent with an embodiment of the present invention.

FIG. 2 illustrates an example of backorder processing (BOP), consistent with an embodiment of the present invention. A processor 3, such as a back order kernel 3, may carry out the back order processing, which includes carrying out an availability check including RBA. A first process decides which items of the back order are to be checked and in which sequence. To do so, a filter is defined. The filter includes a filter type that defines which criteria are used to select the items to be processed. Criteria are, for example, customer type, product/location, item type (for example, sales order). The filter also includes a filter variant that defines which values of defined criteria meet the conditions of the filter. The order items may be stored in the OLTP system. They may also be stored in SAP APO. The filtering selects items corresponding to the particular filter to the particular data base. For example, the filter type may define a parameter—customer type. The filter variant may define the parameter value—customer type—very important or medium. This filter then selects only items having a very important and medium important customer. In one embodiment, the filter can be designed to define back orders.

Two further situations are now described. In event driven quantity assignment (EDQA), back order processing including global ATP is used as an internal tool. If several orders cannot be confirmed and a quantity is received that the system can assign, back order processing begins. For example, if a sales order is cancelled, the released quantity can be reassigned. Such a quantity assignment is called EDQA. In addition to be the cancellation of an order, the event may include incoming stock and a changed order. In a second situation, an order confirmation is reassigned. Reassignment of order confirmation (ROC) takes places if a very important order for a very important customer is created or changed and no quantity is available. In such a situation, quantities can be "stolen" from unimportant orders even if they are confirmed. For example, for orders that may be defined as a low priority order, their quantities may be reassigned to high priority orders. ROC is generally not carried out in a batch process. It may be done independently of back order processing and may be carried out online.

EDQA and ROC may use order due lists (ODL) which are described in more detail hereinafter. Order due lists may use a filter to select orders. The ODL filtering is used if the order is saved. At the time that the order item is saved, all filters of order due lists are scanned. If an ODL is activated, it is being filled by the system via inbound interface with corresponding OLTP documents.

In conventional back order processing systems, the system has to search for back ordered items by filtering an entire database to find affected items. Consistent with an aspect of the present invention, ODLs provide an index function, and allow affected items to be stored immediately after being saved. In this way, affected items can be retrieved also quicker than in conventional systems.

The ODL is an additional database element. It may have a restricted number of fields and may perform the function of an index. It is assigned to a process, for example, EDQA. It performs a pre-selection. The function performed is that of a sorter. The ODL pre-selection may be edited manually. The pre-selection may be at least one of edited, deleted or overruled. The ODLs may be used as a reference for searching items under consideration of its priority. The order types of the handled items, the criteria to filter, and to sort them can be freely configured. Filter and sorter may be defined independent from the ODL.

Selection can be aborted after the number of necessary items is reached. The selection from the ODL obeys the corresponding sort profile. The ODL has a type. The ODL type defines the nature of items that can be contained in the ODL. For example, the types "Obtain Confirmation (RCV)," "Lose Confirmation (SPL)," and "Free Work List (WLS)" are supported. The filter assigned to the ODL comprises a filter type and a filter variant. The filter type defines the criteria and the variant contains the values of the criteria to select the items. Per filter type several variants can be defined. The sorter assigned to the ODL contains the criteria to sort the items. Database objects as well as source code may be generated out of the settings of an ODL. An ODL may comprise a database table with a specific database index and specific source code for table access. The generated database table may depend on the criteria that are used to calculate the item priority (sorter). The generated source code for selection from the ODL may be used, for example, by any SAP SCM application.

The ODLs of the type "Free Work List" are defined without specifying a filter. The assignment of the sorter is optional. They may be filled manually and can be used like a notepad for order items. Items can be added to this ODL in the display of the explanation component of the availability check, in the display of the backorder processing (BOP) result, or in the display of the work list. The situations where items can be added to work list ODLs are not restricted. These work list ODLs can be used as a work list of BOP.

In conventional systems, complete selection of affected items from several database tables and LiveCache was necessary. Sorting the items was only possible after filtering them from database. No sort/filter based reference was available. In contrast, in accordance with embodiments of the present invention, it is possible to let the customizable filter work before storing the data in a reference table. Further, a quick item search by creating a customized database object is also possible. It is possible to allow creation of ODLs only if it is needed.

ODLs can be used at any place, where pre-selected lists of orders or order items are necessary (e.g., out of performance reasons). ODLs can be used, for example, in SAP SCM during event driven quantity assignment (EDQA) and also in back order processing as a reference to items that should be confirmed and during reassignment of quantity confirmations (ROC) as a reference to items that can lose their confirmations and during backorder processing as a work list. Using ODLs, a list of items fulfilling the criteria of the filter are selected. The ODL provides an index in the database table, so that all data in the table can be accessed. For example, a sales order that may be stored in LiveCache or 10 database tables where there are around 500 to 800 fields. ODL are linked to the databases, the order ID is used as a key to rapidly access the databases. The index is used to pre-select quickly. The index is defined by customizing based on the sorter definition. In this way, the system finds all items associated with the order for BOP.

With further reference to FIG. 2, there may be a flexible assignment of pre-defined events and triggering modules to start workflows that are related to back order processing (BOP). EDQA Agent 2 handles this assignment. EDQA agent is a tool that is related to BOP. EDQA agent uses ODLs as input for confirmation of back ordered items after being triggered, by an event, for example, by goods receipt. EDQA uses a processor, in particular, BOP kernel 3 (a BOP based process step) and its output mechanism during the workflow. For example, in FIG. 2, the triggering event 1 may be a process/even in an external system, for example, a goods receipt. Once the goods are received, EDQA is triggered, as triggered activity 2. EDQA agent 2 reads the stored data in data storage system 4 (in this case ODL). Subsequently, BOP is carried out by BOP kernel 3. BOP is carried out when necessary. It may be carried out as a batch. Result list 5 of the BOP is provided to an output buffer 6, which is the SAP APO storage system. The result list in the output buffer is subsequently sent to the OLTP system.

Order due lists are defined, generated and activated using an ODL builder and ODL agent, respectively. Generating of corresponding database tables for storage in ODL 106 is performed by the ODL builder and based on customizable filter and sort parameters. The ODL builder also generates selection source code, which is used during the EDQA and filter source code that is used for filling the index tables. The function of the ODL builder is to build a kind of cross reference for items in accordance with a chain identifier to allow a fast access to the appropriate sales orders. Once the ODL is generated, the generated tables are filled by an ODL agent, for example, in SAP APO. Fata 120, for example, "Location product A with confirmed quantity equal zero," is stored in the generated tables by the rules-based ATP check 16 caused by order processing in the OLTP system. The OLTP system may be, for example, a SAP CRM Order Management system. The data to be stored in the tables may be buffered in an ATP buffer prior to being filled in the tables in ODL 106 by the ODL agent. The ATP rules evaluation will store the corresponding chain ABC 102 in a temporary data buffer, ATP buffer. The data is stored in the ATP buffer until the document is saved.

The ODL is a database object that may comprise one or more tables. The tables are generated by the ODL building according to sort profiles to allow fast data selection. The ODL builder builds the database tables of ODL in the SAP APO. The table structure depends on the sort profile that is used during the selection of the orders. The sort profile defines the sequence in which the items are to be processed. The sort profile specifies the characteristics, their sequence (or weighting) and the sort direction.

Figure 3:
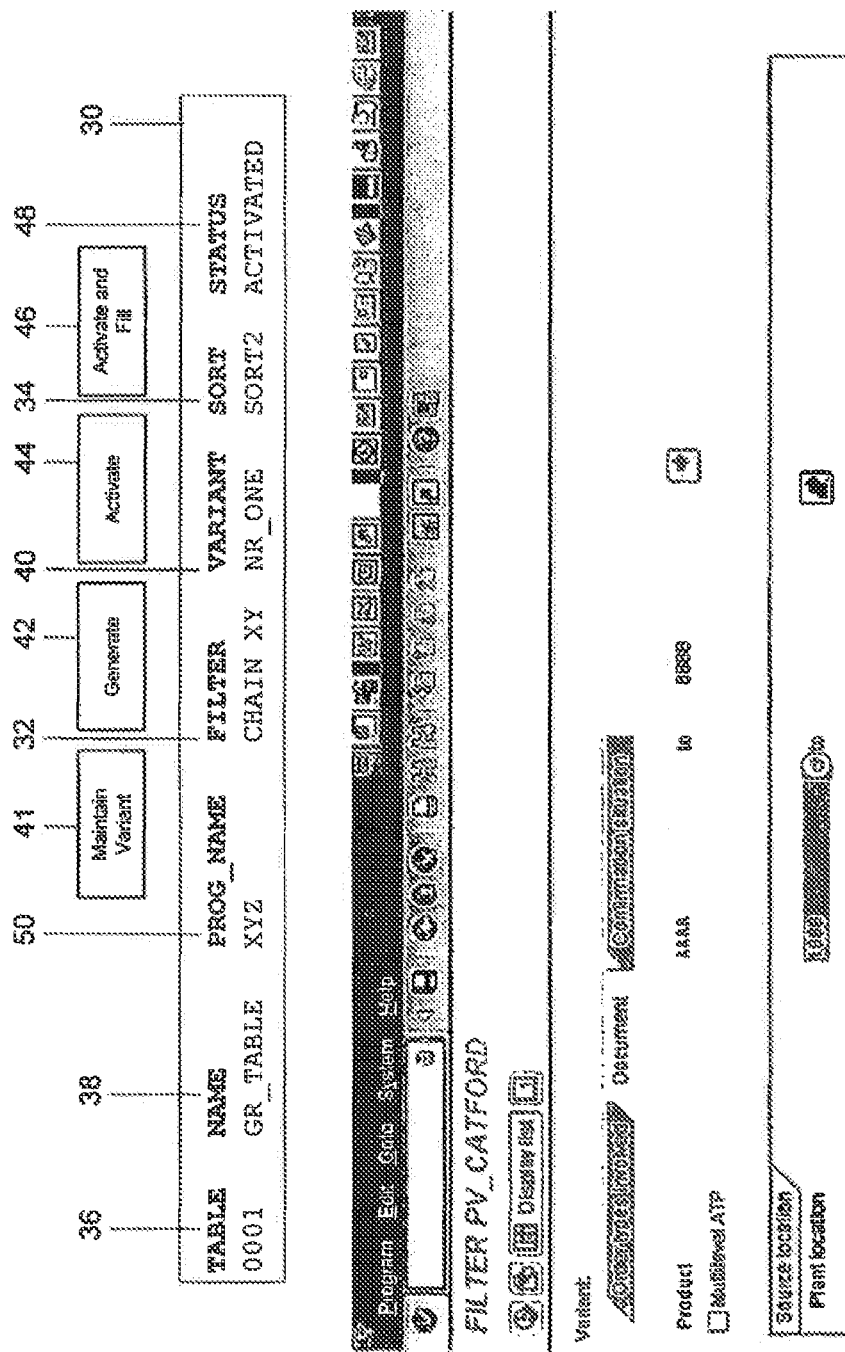
FIG. 3 illustrates an exemplary activated ODL user interface, consistent with an embodiment of the present invention.

FIG. 3 illustrates an exemplary activated ODL user interface, consistent with an embodiment of the present invention. ODL definition 30 includes a predefined filter type 32 and filter variant 40, for example, a filter type, CHAIN XY, having filter variant NR_ONE. This forms a filter where the evaluation of the chain is enabled. All replacements of the chains containing the specified products will enhance the selection range of the product. ODL definition 30 may also include a sort profile 34, for example, a sort profile SORT 2. Filter type 32 and sort profile 34 are customizable. ODL 30 may include an identifier 36 and a name 38. A filter variant 40 with filter conditions for a filter type can be created and used. As mentioned above, the filter selects items corresponding to the particular filter to the particular data base. For example, the filter type may define—parameter—customer type. The filter variant may define parameter value—customer type—very important or medium. The variant can be maintained by clicking on a "maintain variant" icon 41. The predefined sort profile 34 is chosen. In the example shown, sort profile 34 is SORT2. Once the ODL is defined, the corresponding table can be generated by clicking on generate icon 42. A generated table can be activated by clicking on activate icon 44. It can be activated and filled by data stored in a database by clicking on icon activate and fill 46. In the example shown, ODL definition 30 includes a status 48 indicating that the ODL is "activated."

The ODL builder data basis comprises the following object groups: structure for definition of fields valid for all filter types and sort profiles, database tables for filter definition and generation of corresponding program code statements, database tables for sort profile definition and generation of corresponding program code statements and database table for assigning of filter/sort to ODL tables and generation/activation of the tables.

The ODL definition may further include a filter variant definition according to an embodiment of the invention. Having chosen a filter type 32, a filter variant 40 that is valid for the filter type can be chosen. The variant may be predefined. Further, the filter variant can be maintained. It is also possible to create a filter variant. The filter variant includes the filter conditions according to the filter type parameters. Filter variant 40 and filter type 32 build together actual filter 32, 40. Further, a sort profile 34 can be chosen from one of the predetermined, maintained sort profiles. Within the maintenance view screen, it is also possible to change ODL description, delete ODLs, generate ODLs, drop and refresh code, activate ODLs 44, activate and fill tables 46, and deactivate ODLs. As mentioned, the filter type definition, the sort profile definition can be customized. Based on sort profile 34, a database table with appropriate database index is generated by clicking on generate icon 42. Based on the chosen filter 32 and program code template, a program name 50, for example, XYZ, and program code for filling the table by ODL agent 14 is generated. Based on chosen sort profile 34 and program code template, a program name 50 and program code for selection from the table by EDQA is generated. Once generated, status 48 of the ODL becomes GENERATED 52. It is noted that the ODL table, although generated, does not contain any entries at this point. Activation of a table by clicking on activate icon 44 immediately enables filling it by necessary and eligible index date. Activate and fill function 46 may be used for filling the table with index data of possibly already existing backorder items, which are eligible for the table. The table (filter/sort) can be valid for greater than or equal to 1 trigger events 1. Reassigning a filter/sort makes ODL organization necessary. For example, if it is decided to use a different filter but the existing data does not meet the conditions of reorganizing. Below the ODL definition a screen shot shows an example of a filter variant. The filter parameters "product" and "source location" are chosen and can be maintained.

Figure 4:
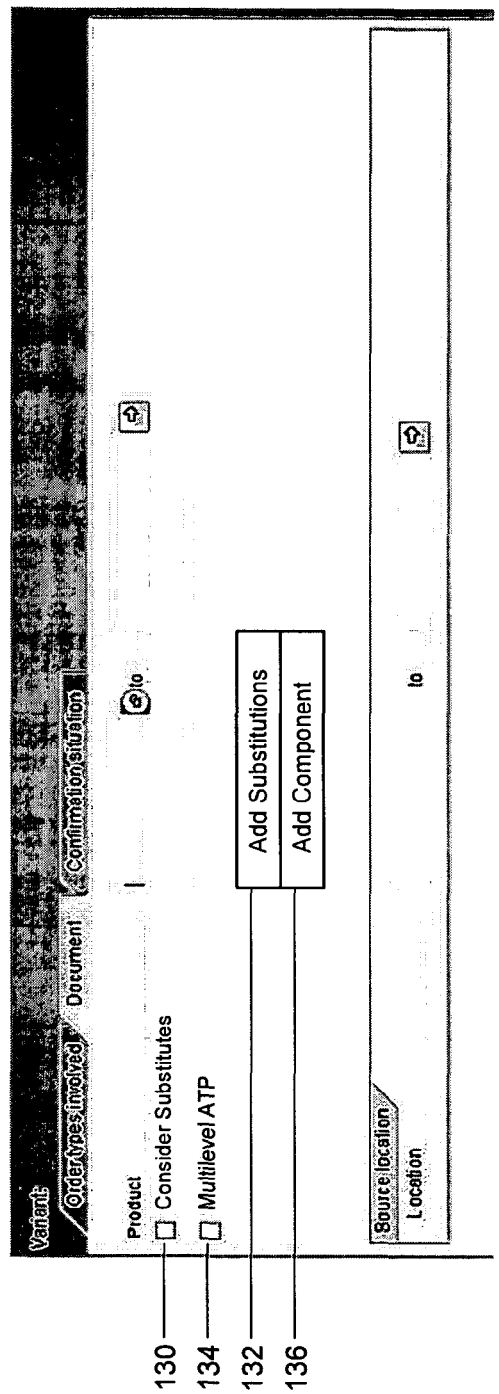
FIG. 4 illustrates an example of how a selection via a chain is made visible in a user interface, consistent with an embodiment of the present invention.

FIG. 4 illustrates how an example of how a selection via a chain is made visible in a user interface, consistent with an embodiment of the present invention. "Consider substitutes" indicator 130 and "add substitutions" button 132 both work at the chain. They work together with the range "product." "Multilevel ATP" 134 and "add components" 136 work in the same way, but may use another source to get the list of products.

The function "Range" is a standard functionality in the user interface of SAP. It means that the user can add for example a list of product names and/or a range means all products between "A" and "CCCC" and/or a pattern of a product name, means for example, all products whose name starts with "A." The user has two possibilities to use the chain together with the selection via the product. The basis for this functionality is always the list of products specified in the range "product." In the following, it is referred to as "specified products."

If "consider substitutes" indicator 130 is set, automatically all other products which are related to the specified one will be added to the range of products in the filter. This enhancement of the filter range is done at any execution of the filter. The list is based on the current information in the replacement chain, but it cannot be influenced by the user. Instead, if "add substitutions" button 132 is pressed, the actual content of the replacement chain is read and added to the range "product" that can be seen in the screen. This is done if the user defines the filter variant. The range will contain the actual active situation and will not reflect automatically any changes done in the future in the rules. To get an update later on, the filter variant has to be maintained again by pressing button 132. This can be done with minimal manual effort. If the range is enhanced by the content of the related replacement chains, the user can modify the list of products by adding or deleting entries in the list.

Figure 5:
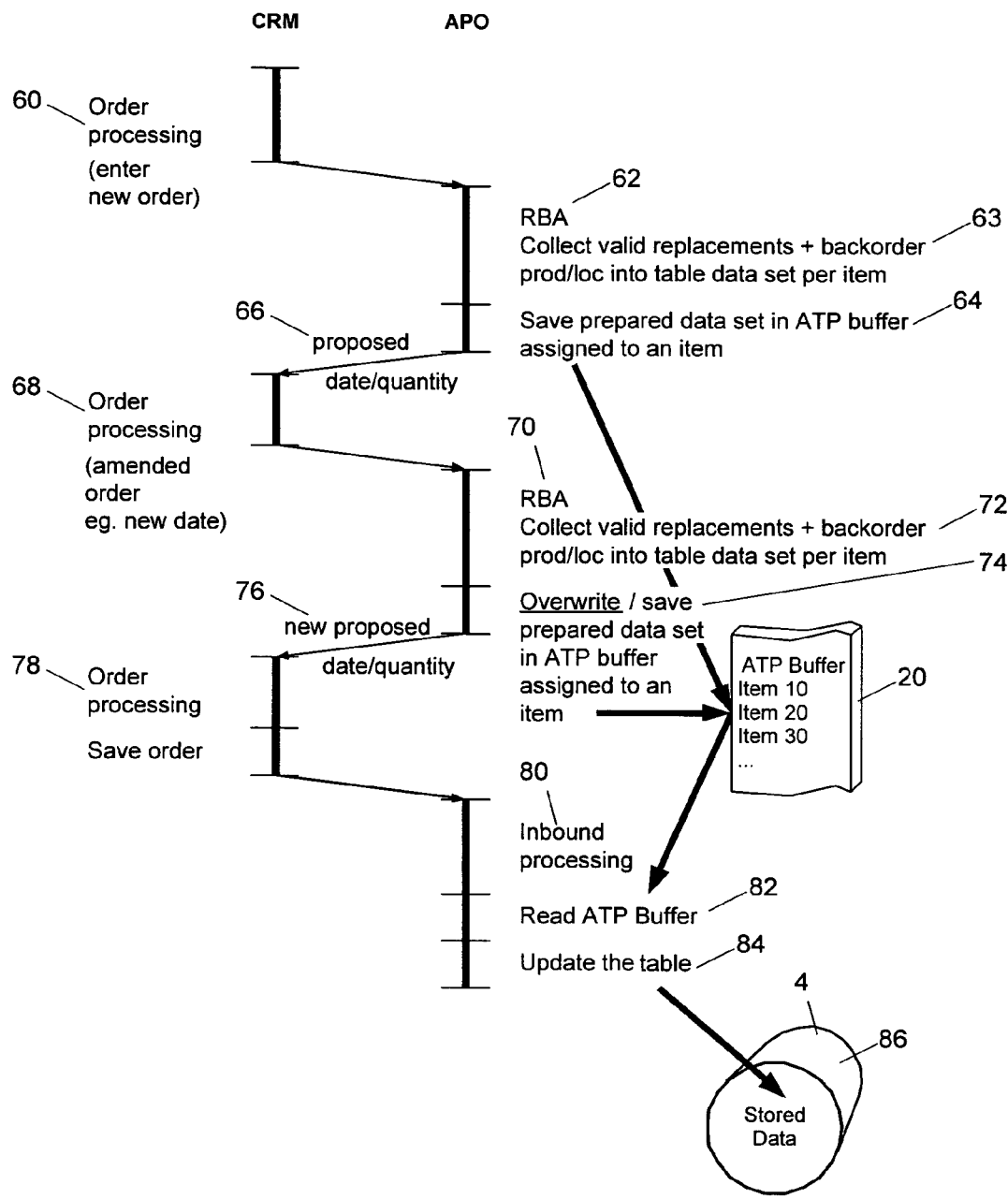
FIG. 5 is an exemplary flow diagram illustrating preparation of ODL table data, consistent with an embodiment of the present invention.

FIG. 5 is an exemplary flow diagram illustrating preparation of ODL table data, consistent with an embodiment of the present invention. Having generated and activated one or more ODL tables, as described above, the following functionality is achieved. At the time global ATP is called, a data set is prepared. ODL agent 14 may use this data set for filling the ODL tables. The data set may include the following information: a list of product/location combinations that are valid for the item and result from the RBA, product/location combination where the replenishment indicator from master data has an appropriate value. Collected data is assigned to corresponding items and saved in ATP buffer 20 until the order is saved in the OLTP system and ODL agent 14 in SAP APO inbound read them and extract the list of possible product/location combinations.

In particular, FIG. 5 shows the interaction between SAP CRM and SAP APO according to an embodiment of the invention. In SAP CRM, a new order is entered (step 60) in order processing. For example, the new order may include a product, an amount and a date for delivery. Once entered, SAP APO carries out an availability check, for example, a RBA (step 62). Within the availability check valid location product replacements, as well as the location product where the backorder is created, are collected per item (step 63). The prepared, collected data set is saved in ATP buffer 20 assigned to an item (step 64). On the basis of the availability check, SAP APO returns a proposed date and quantity back to SAP CRM (step 66). In SAP CRM order processing, the amended order is processed on the basis of the proposed date and quantity (step 68). For example, the amended order may have a new request date. Once amended, SAP APO carries out an availability check for the amended order. Again, valid location product replacements, as well as the location product where the backorder is created are collected per item (step 72). Subsequently, the prepared data set in ATP buffer 20 assigned to an item is overwritten and saved (step 74). A new proposed date and quantity, on the basis of the availability check (step 70) is provided to SAP CRM (step 76). In order processing in SAP CRM, if the new proposed date and quantity are acceptable, the order is saved (step 78). Once the order is saved, inbound processing occurs (step 80). Next, ATP buffer 20 is read (step 82). The ODL table is filled (step 84) by ODL agent 14. The filled table is stored in storage medium 4 (step 86). As mentioned previously, in this way, the ODLs provide an index function which allows affected items to be stored immediately after being saved. In this way, affected items can be retrieved also quicker than in conventional systems.

If rules-based ATP (RBA) is applied on an item, ATP rules evaluation will compile the product/location list which is needed by ODL agent 14 after the order was saved in the OLTP system. The compilation of the list is influenced by customizing of a rule strategy list. In order to avoid unnecessary data transfer by ODL agent 14, the process customizing defined which rule strategies are to be taken into account for replacements list creation during the ATP check/rules evaluation. The list of valid product/location combinations is compiled for each rule strategy (one or more per item), which is maintained for EDQA. It is further influenced by the business transaction. The business transaction parameter can furthermore control the list compilation. Data set preparation is, for example, carried out during online/batch order processing and postponed sourcing. It is further influenced by rules evaluation tolerance. A flag, which controls the completeness of the product/location replacement list that results from the RBA. If switched on, only product/location combinations that result from executed rules evaluation will be considered. If switched off, all possible product/location combination that could result from RBA will be considered.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. Further, computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A system for automatically determining substitution chains that are valid during a rules-based ATP check for an order item, the system comprising:
   an interface for interfacing with a plurality of data storage devices in at least one of which a plurality of stock items are stored as data;
   an execution memory storing software;
   a buffer for temporarily storing the data; and
   a processor coupled to the interface and the execution memory, the processor executing the software to carry out an availability check to identify a replacement chain describing a replacement product for at least one of the plurality of stock items,
   wherein the availability check references an order due list database element comprising one or more tables having structures based at least on a profile that defines an item processing sequence, the order due list database element providing an index to pre-select and sort potential replacement products, the availability check determining a location of the replacement product, an available quantity of the replacement product, and a date of delivery of the replacement product, and
   wherein the replacement chain is determined by one or more rules defining substitutions.

2. The system according to claim 1, wherein the replacement chain is stored on an order item level until the order is saved and updated in a supply chain management software system.

3. The system according to claim 1, wherein the software saves the replacement chain in a separate database during an update process.

4. The system according to claim 1, wherein the software assigns an identifier to the replacement chain.

5. The system according to claim 4, wherein the identifier connects processes without carrying out a rules evaluation.

6. A computer-implemented method for determining substitution chains that are valid during a rules-based ATP check for an order item, wherein rules define possible substitutions, the method comprising:
   interfacing, by a processor, with a plurality of data storage devices in at least one of which a plurality of stock items are stored as data;

storing the data in a buffer; and carrying out, by the processor, an availability check to identify a replacement chain describing a replacement product for at least one of the plurality of stock items, wherein the availability check references an order due list database element comprising one or more tables having structures based at least on a profile that defines an item processing sequence, the order due list database element providing an index to pre-select and sort potential replacement products, the availability check determining a location of the replacement product, an available quantity of the replacement product, and a date of delivery of the replacement product, and wherein the replacement chain is determined by one or more rules defining substitutions.

7. The method according to claim 6, wherein the replacement chain is stored on an order item level until the order is saved and updated in a supply chain management software system.

8. The method according to claim 6, wherein the replacement chain is saved in a separate database during an update process.

9. The method according to claim 6, wherein the replacement chain is assigned an identifier.

10. The method according to claim 9, wherein the identifier connects processes without carrying out a rules evaluation.

11. A non-transitory computer-readable storage medium storing program instructions for determining substitution chains that are valid during a rules-based ATP check for an order item according to a method, the method comprising:

interfacing with a plurality of data storage devices in at least one of which a plurality of stock items are stored as data; and carrying out an availability check to identify a replacement chain describing a replacement product for at least one of the plurality of stock items, wherein the availability check references an order due list database element comprising one or more tables having structures based at least on a profile that defines an item processing sequence, the order due list database element providing an index to pre-select and sort potential replacement products, the availability check determining a location of the replacement product, an available quantity of the replacement product, and a date of delivery of the replacement product, and wherein the replacement chain is determined by one or more rules defining substitutions.

12. The non-transitory computer-readable storage medium according to claim 11, wherein the replacement chain is stored on an order item level until the order is saved and updated in a supply chain management software system.

13. The non-transitory computer-readable storage medium according to claim 11, wherein the replacement chain is saved in a separate database during an update process.

14. The non-transitory computer-readable storage medium according to claim 11, wherein the replacement chain is assigned an identifier.

15. The non-transitory computer-readable storage medium according to claim 14, wherein the identifier connects processes without carrying out a rules evaluation.

* * * * *